(12) United States Patent
Duncan (10) Patent No.: US 12,390,380 B2
(45) Date of Patent: Aug. 19, 2025

(54) ELECTRICALLY LEVELING SLEEP SUPPORT FRAME

(71) Applicant: Andrew Duncan, Bozeman, MT (US)

(72) Inventor: Andrew Duncan, Bozeman, MT (US)

( * ) Notice: Subject to any disclaimer, the term of this patent is extended or adjusted under 35 U.S.C. 154(b) by 256 days.

(21) Appl. No.: 18/222,454

(22) Filed: Jul. 16, 2023

(65) Prior Publication Data

US 2025/0017794 A1  Jan. 16, 2025

(51) Int. Cl.
*A61G 7/018* (2006.01)
*A47C 17/80* (2006.01)
*A47C 19/00* (2006.01)
*A47C 19/02* (2006.01)

(52) U.S. Cl.
CPC .............. *A61G 7/018* (2013.01); *A47C 17/80* (2013.01); *A47C 19/005* (2013.01); *A47C 19/025* (2013.01)

(58) Field of Classification Search
CPC ........... A47B 91/16; A47B 9/20; A47B 91/12; A47B 13/08; A47B 2200/0052; A47B 13/083; A47B 2220/0027; A47B 2230/0077; A47B 9/10; A47B 91/005; A47B 91/08; A47B 91/10; A47C 17/80; A47C 17/86; A47C 20/041; A47C 19/045; A47C 7/002; A61G 7/012; A61G 7/0573; A61G 13/0036; A61G 13/02; A61G 13/08; A61G 13/101; A61G 13/1205; A61G 13/1265; A61G 13/128; A61G 13/1295; A61G 2203/12; A61G 2210/50; A61G 7/001; A61G 7/018; B60P 3/38; B60P 3/39
USPC .................................. 108/147.19, 27; 5/118
See application file for complete search history.

(56) References Cited

U.S. PATENT DOCUMENTS

| | | | |
|---|---|---|---|
| 6,993,798 B1 * | 2/2006 | Roberts | A47C 19/045 5/118 |
| 7,146,662 B1 * | 12/2006 | Pollard | A47B 91/16 5/118 |
| 8,468,626 B2 | 6/2013 | Carrier | |
| 9,933,775 B2 * | 4/2018 | Saavedra | A61G 7/0573 |
| 2015/0320213 A1 * | 11/2015 | Sorrell | A47B 9/04 108/147.19 |
| 2022/0110449 A1 | 4/2022 | Huff et al. | |

* cited by examiner

*Primary Examiner* — Madison Emanski
(74) *Attorney, Agent, or Firm* — Nathanial P. Potter (57) ABSTRACT

A self-leveling sleep surface frame includes linear actuators at each corner of a sleep surface frame connected by bi-directional joints to a plurality of telescoping beams which allows for the length of the beams to change and the angle of the connections between the beams and joints to adjust while achieving a level position for the sleep surface frame when a sleeper vehicle is on an unlevel surface.

18 Claims, 7 Drawing Sheets

ELECTRICALLY LEVELING SLEEP SUPPORT FRAME

FIELD OF THE INVENTION

The present invention generally relates to electrically operated, self-leveling bed frames. More particularly, the present invention related to said bed frames to be used in vehicles such as vans, campers, RVs, and sleeper cabs within semi-trucks.

BACKGROUND OF THE INVENTION

Vans, Campers, and RVs (collectively sleeper vehicles) have significantly increased in popularity over the past several years. Newer generations value freedom and mobility higher than previous generations (preference to remote work being a leading indicator of this phenomena). This preference for freedom and mobility is coupled with increasing rent and home prices which negatively impact many individuals and families. Consequently, taking long trips or living permanently in sleeper vehicles has become more common. This means more people are experiencing a problem when taking a trip in or living in a sleeper vehicle, namely, the difficulty of finding a level surface to park on to provide a level surface to sleep on. It is well documented that the level or slant of a sleeping surface impacts the sleeper's skeletal, muscular, and cardiovascular systems. This can lead to physical and/or mental conditions over time.

Another type of sleeper vehicle is a semi-truck with a sleeper cab. While these vehicles are more prone to parking within a hopefully level spot (such as the parking lot at a gas station), small degrees of unevenness may still call for leveling of a bed to ensure optimal sleep.

Without additional infrastructure or technology, the levelness of all surfaces in sleeper vehicles is relative to the levelness of the sleeper vehicle's frame, which is dependent on the levelness of the ground, street, road, etc. In many cases, especially when camping on dirt roads, there is no level place to park. And, if there happens to be a spot that is level, it is usually highly contested by other campers. There exists a couple of solutions to level the entire sleeper vehicle; however, these solutions are either not effective and too cumbersome on a user or are cost prohibitive for other users.

SUMMARY OF THE INVENTION

The following presents a simplified summary of the present invention to provide a basic understanding of the invention's concepts. This summary is not an extensive overview, and it is not intended to identify critical elements or to limit the scope of this disclosure. The sole purpose of this summary is to present some general concepts in a simplified form as a prelude to the detailed description of the invention.

The subject matter disclosed and claimed herein, in some embodiments of the present invention, relates to a self-leveling sleep surface frame for use in a sleeper vehicle, comprising a sleep surface frame having at least four beams in a generally rectangular shape with four assembled corners created by the intersection of the distal ends of two paired beams, wherein at least three of the beams are telescoping beams; at least three of the assembled corners being individually coupled with a bi-directional joint; at least three linear actuators for raising and lowering a portion of the sleep surface frame that are individually coupled via a coupling structure to at least three of the bi-directional joints; a mounting means coupled to each linear actuator which secures the self-leveling sleep surface frame inside the sleeper vehicle; a controller unit which is operatively connected to and causes at least one actuator motor of at least one of the linear actuators to move; and a power unit to supply power to the controller unit and the linear actuators.

To the accomplishment of the foregoing and related ends, certain illustrative aspects of the disclosed innovation are described herein in connection with the following description and the annexed drawings. These aspects are indicative of only a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The embodiments of the present invention disclosed herein are illustrated by way of example, and not by way of limitation, in the figures of the accompanying drawings, in which like reference numerals may refer to similar elements.

DETAILED DESCRIPTION OF THE PRESENT INVENTION

The innovation is now described with reference to the drawings, wherein reference numerals are used to refer to elements throughout. In the following description, for purposes of explanation, numerous specific details are set forth to provide a thorough understanding of the present invention. It may be evident that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

One existing solution to the problem of obtaining a level bed within a sleeper vehicle (including vans, campers, RVs, semi-trucks, etc.) uses plastic blocks that a user lays on the ground and drives on top of to change the height of individual tires. The plastic blocks can only be stacked so high before may be unsafe in certain situations or making more severe unlevel areas uncorrectable. The plastic blocks also require the user to go outside and guess how much each tire needs to be elevated which can be time-consuming and cumbersome, especially so when the sleeper vehicle is forced to park in an unsafe area or there are weather-related concerns like rain, snow, cold winds, etc.

Another existing solution is the use of powerful, expensive hydraulic lifts that are installed to the chassis of the RV or camper van and lift the entire sleeper vehicle to level the vehicle. These are prohibitively expensive and cannot be used safely on some types of terrain or during certain types of weather. Therefore, when concerning leveling a bed or sleep surface within a sleeper vehicle, it is much more practical and often cheaper to merely level that sleep surface.

There also exists level adjustable beds for use in vehicles such as sleeper cabs; however, they lack the nuanced improvements of the present invention. Namely, frame design and new elements of the present invention provides unique benefits that leads to higher durability and stability as well as increased ranges of motion and orientation for a sleep surface frame. The inclusion of self-leveling controls and technology also allows for the sleep surface frame to be leveled without extensive knowledge on how to do so or effort by the user.

Figure 1:
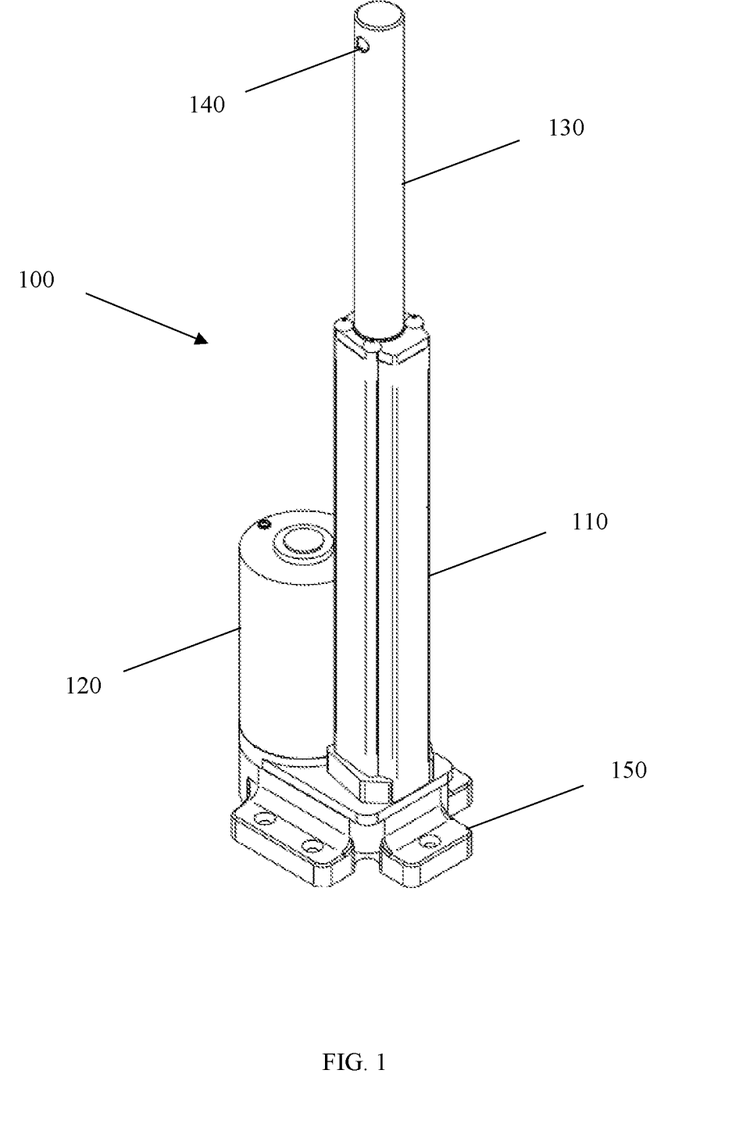
FIG. 1 depicts one embodiment of a linear actuator used in some embodiments of the present invention coupled with a mounting bracket and in an extended position.

FIG. 1 depicts one embodiment of a linear actuator used in some embodiments of the present invention coupled with a mounting bracket and in an extended position. In some embodiments, a linear actuator 100 for raising and lowering at least some portion of a sleep surface frame includes a housing structure 110, an actuator motor 120 and an extending member 130. The linear actuator 100 may be coupled to a mounting bracket 150 which may be secured within or to a sleeper vehicle. The linear actuator 100 includes a housing structure 110 that (at least partially) contains the extending member 130 when the extending member 130 is in the retracted position and the extended position. The extending member 130 also includes a coupling structure 140 such as the depicted bi-directional joint mounting hole.

In some embodiments, the mounting bracket 150 is one form of a mounting means that may be secured to a floor, wall, or some other part or other structure within the sleeper vehicle. Further, most mounting brackets used in the present invention will rigidly secure the linear actuator 100, adding stability to a sleeping surface as a user lies or sits on and/or moves about atop the sleeping surface.

In alternative embodiments, the extending member 130 may be coupled to a guide rail (another form of mounting means) either directly or by another form of mounting bracket designed to engage with the guide rail. The guide rail offers movement along the axis of the extending member 130 but restricts any radial movement. Typically, the guide rail is installed on the interior of the sleeper vehicle in a manner that is co-linear with the extending member 130 and allows for at least one linear actuator 100 to move along at least one axis on of a plane to prevent any undesired movement by the frame when a linear actuator is partially or fully extended. In some embodiments, the at least one linear actuator 100 moves along the plane in a straight line along the X-axis or Y-axis relative to the length of the sleeper vehicle. In alternative embodiments, the at least one linear actuator 100 moves along a diagonal on the plane.

Figure 2A:
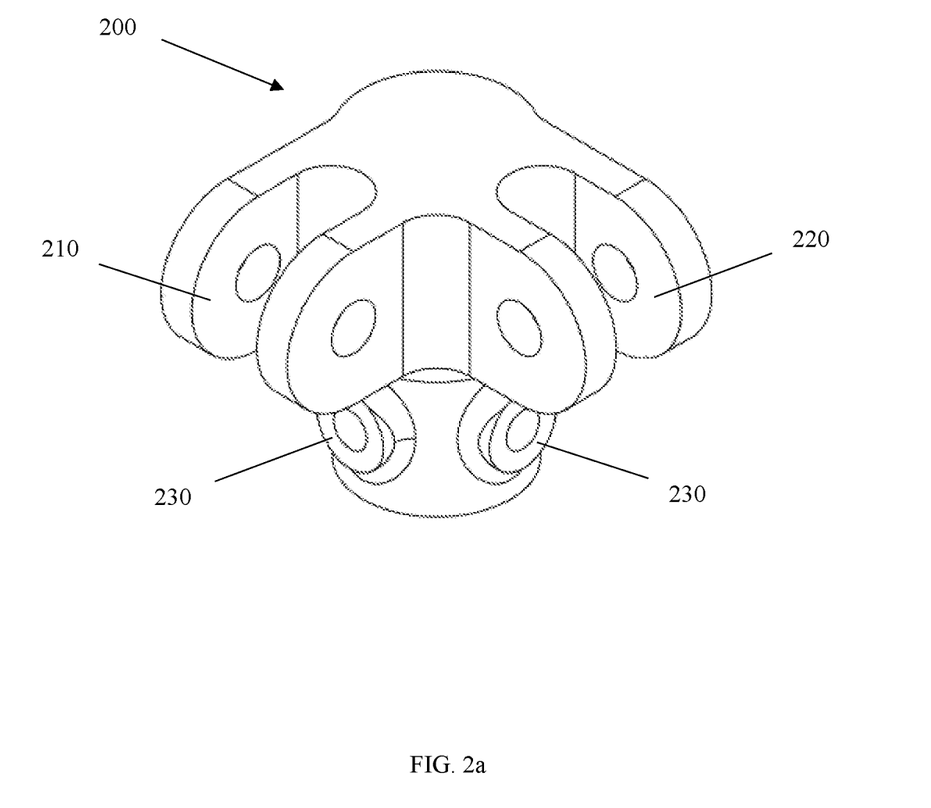
FIG. 2a is an isometric view from above one embodiment of a bi-directional joint which is part of the present invention.

FIG. 2a is an isometric view from above one embodiment of a bi-directional joint which is part of the present invention. In some embodiments, a bi-directional joint 200 includes a first pivot joint 210 for receiving a first coupling mechanism from a first telescoping beam (or adjustable-length beam or merely "beam"), a second pivot joint 220 for receiving a second coupling mechanism from a second beam, and at least one actuator securing mechanism 230 such as a hole or plurality of holes designed to receive a pin or screw that travels from the exterior of the bi-directional joint 200 through the hole and the extending member's 130 coupling structure 140 and extending through a second hole opposite the first hole or engaging with a coupling mechanism opposite the first hole to secure the pin or screw. The first pivot joint 210 and second pivot joint 220 generally create a ninety degree angle and a two-hundred and seventy degree angle, with the ninety degree angle point inward when four bi-directional joints 200 create corners of the sleep surface frame (or bed frame or sleep frame or merely "frame"). The sleep surface frame may support an item such as a typical bed mattress, a box spring, at least one substantially flat object that crosses at least two beams (such as a plank of wood or sheet of metal), or any other object that the sleep surface frame could be adjusted to complement. The sleep surface frame may include securing or coupling mechanisms that engage the mattress, box spring, flat surface, or other object so that it does not move while in use or during travel.

In some embodiments, the actuator securing mechanism(s) 230 may be designed to swivel and/or rotate to some degree to allow for some linear and/or radial movement. For example, the receiving screw hole of one embodiment of the actuator securing mechanism may include a rotary ball or bearing that allows for some movement while a screw is coupled through the receiving screw hole and the coupling structure 140.

Figure 2B:
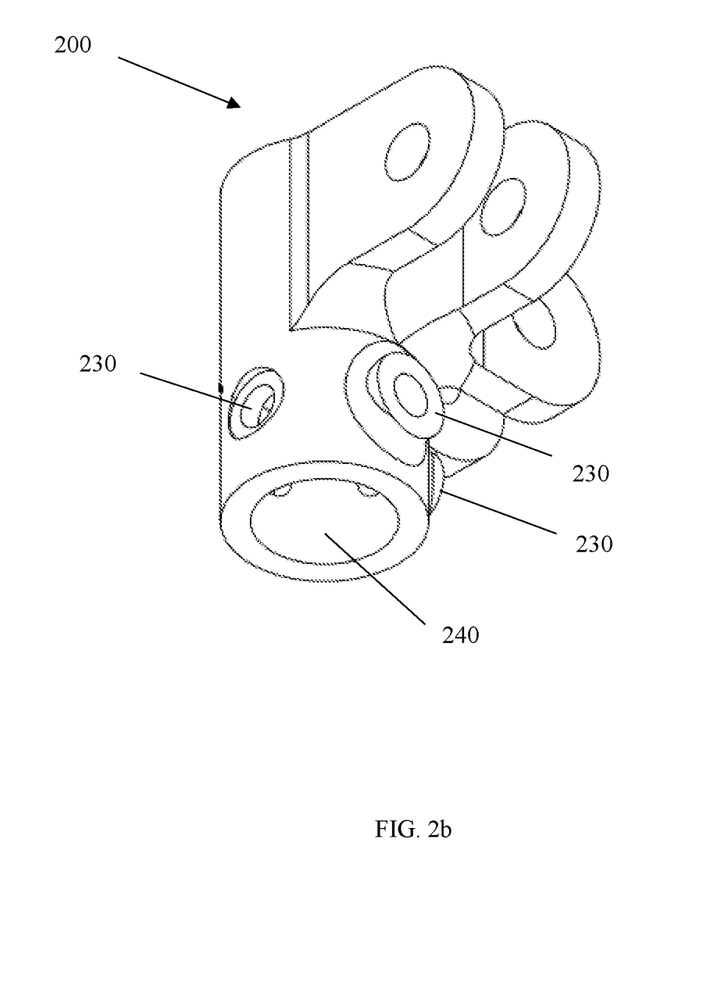
FIG. 2b is an isometric view from below one embodiment of a bi-directional joint which is part of the present invention.

FIG. 2b is an isometric view from below one embodiment of a bi-directional joint which is part of the present invention. In further embodiments, a cavity 240 exists at the bottom of the bi-directional joint 200 for receiving the extending member 130. Further, the cavity 240 may be sufficiently large to allow for some linear and/or radial movement of the linear actuator 100 when it extends the extending member 130. This linear and/or radial movement allows for the linear actuator 100 to experience less stress from being at a non-straight angle within the cavity 240. In this embodiment, these actuator securing mechanisms 230 may also be designed to allow for some linear and/or radial movement. One example of this is an actuator securing mechanism 230 that includes a rubber pin or peg that is sufficiently rigid to firming secure the extending member 130 but pliable enough to allow for some degree of linear and/or radial movement by that extending member 130. This rubber pin or peg may also be slightly longer that what would be flush with the hole or holes (the actuator securing mechanisms 230) on the exterior about the cavity 240 of the bi-directional joint 200 so that when the pin or peg is slightly deformed by radial movement that it is not stretching the rubber but merely slightly twisting it. The excess length of the pin or peg means that it will not disengage from any hole. Further, the pin or peg may have "stopper" ends that will not let it pass through the hole, creating a limit to the amount of radial movement the pin or peg could perform.

Figure 3:
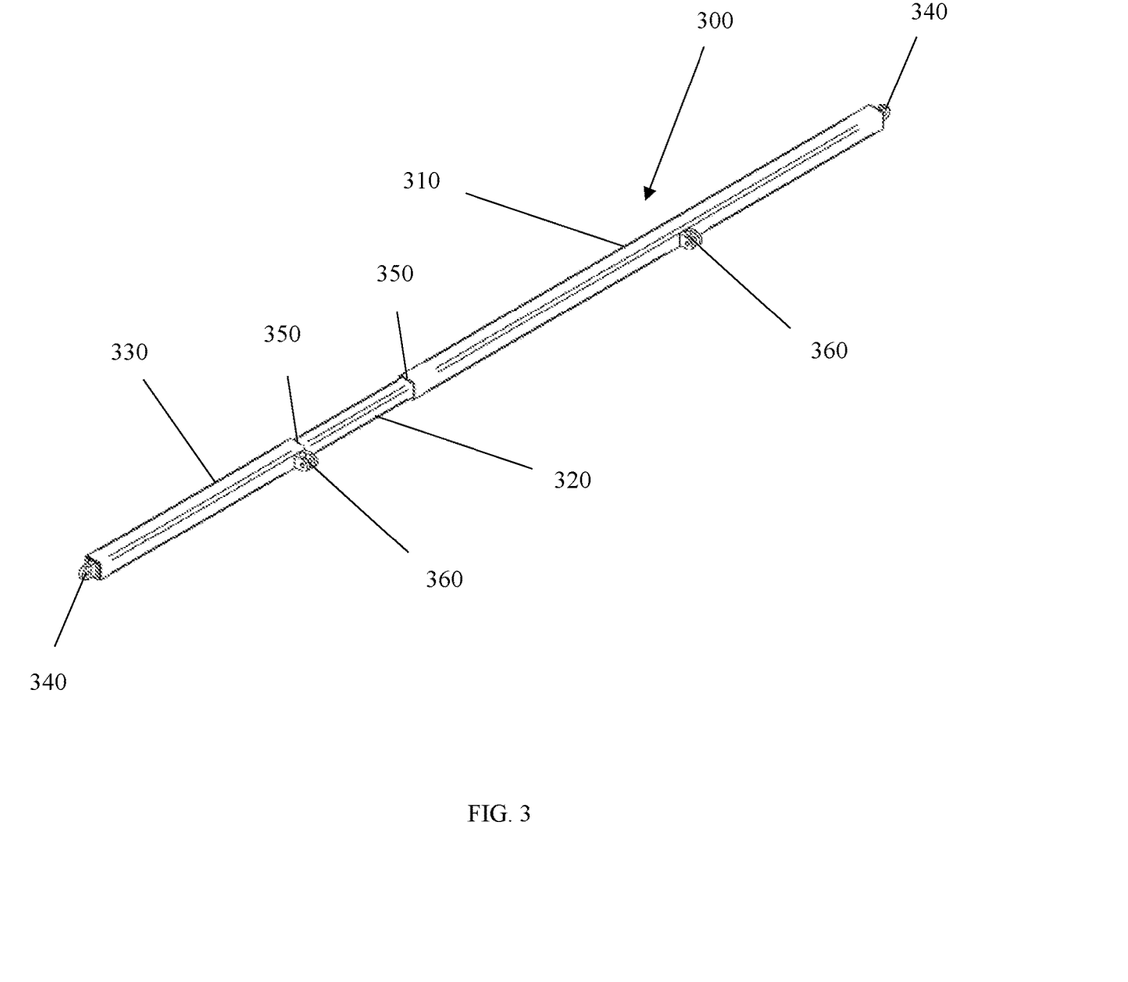
FIG. 3 depicts an exemplary long-length telescoping beam used in some embodiments of the present invention.

FIG. 3 depicts an exemplary long-length telescoping beam used in some embodiments of the present invention. In some embodiments, a long-length telescoping beam 300 includes at least two end pivot joints 340 (which may each be a first pivot joint or a second pivot joint) and is comprised of sections to allow for extension and retraction to change the length of the long-length telescoping beam 300.

In further embodiments, the long-length telescoping beam 300 includes three sections. A first section 310 having an end pivot joint 340 on one end and a receiving cavity 350 for a smaller (in diameter), second section 320; the smaller, second section 320 fitting within the receiving cavity 350 of the first section 310 and being housed (at least partially) by the first section 310; and a third section 330 having a receiving cavity 350 for the smaller, second section 320 on one end and an end pivot joint 340 on the opposite end. Ideally, the smaller, second section 320 should be secured within both the first section 310 and third section 330 by some means as to not allow the second section 320 to fully slide out of either receiving cavities 350 of the first or third sections. In even further embodiments, the long-length telescoping beam 300 may be secured at a desired length by securing the second section 320 to the first section 310, the third section 330, or both. In some embodiments, securing the second section 320 helps prevent the second section 320 from disengaging from the first section 310, the third section 330, or both.

Notably, the depicted embodiment is made up of three of these sections (310, 320, 330); however, any beam used in the present invention would be adjustable length with as few as two sections and as many as is desired by the designer, creator, builder, or manufacturer.

In some embodiments, the long-length telescoping beam 300 may include at least one interior pivot joint 360 which allows the long-length telescoping beam 300 (or a pair of generally parallel beams) to be coupled with a crossbar for added stability and/or function. In less ideal embodiments, the crossbar(s) may be secured to the long-length telescoping beam 300 by other means, such as welding the crossbar directly on the long-length telescoping beam 300. However, unideal embodiments may receive additional stress based on the position that the actuators adjust the frame to in order to level the sleep surface frame.

Figure 4:
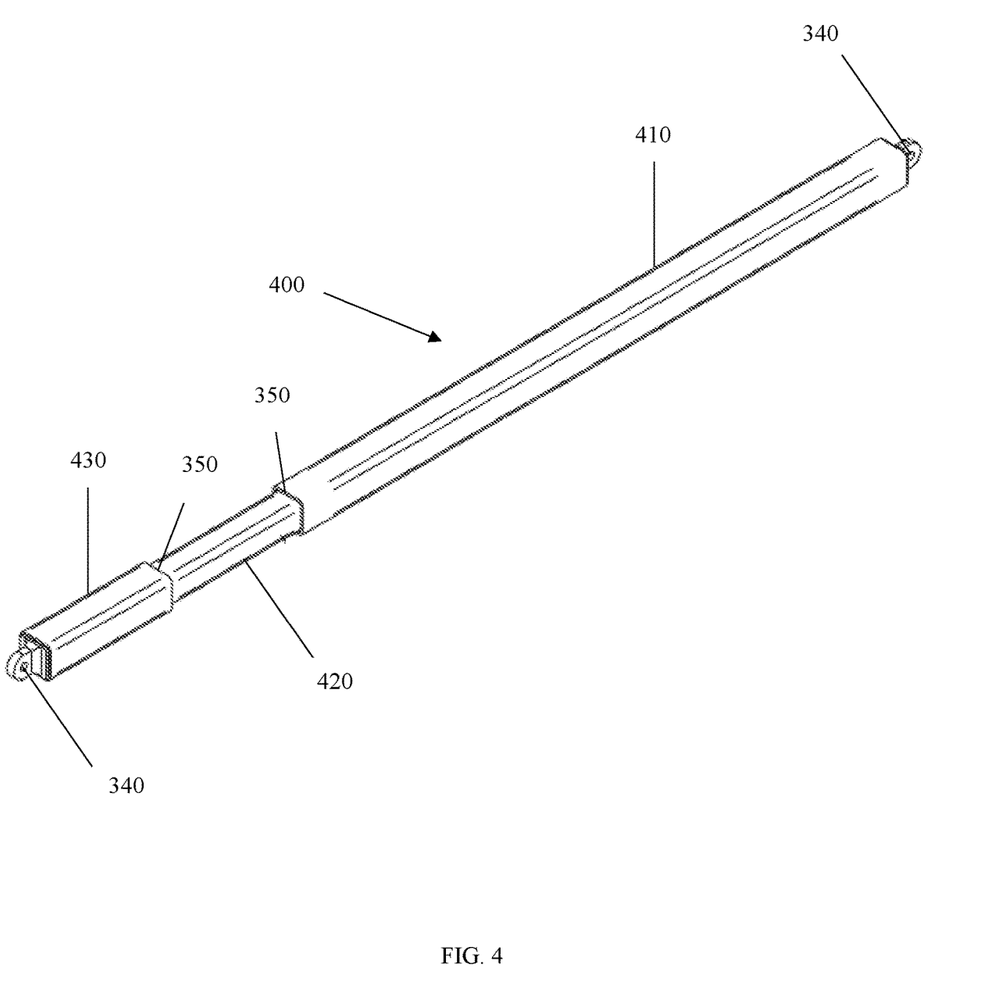
FIG. 4 depicts an exemplary short-length telescoping beam used in some embodiments of the present invention.

FIG. 4 depicts an exemplary short-length telescoping beam used in some embodiments of the present invention. In some embodiment, the short-length telescoping beam 400 is, naturally, shorter than the long-length telescoping beam 300 of FIG. 3 and lacks interior pivot joints 360. The short-length telescoping beam 400 may be used perpendicular to the long-length telescoping beam either as end beams when coupled with the bi-directional joint 200 (forming the top and bottom of the sleep surface frame if the long-length telescoping beams 300 comprise the sides of the sleep surface frame) or as crossbars that engage with the interior pivot joints 360 of the long-length telescoping beams 300 with the short-length telescoping beams' 400 end pivot joints 340. Notably, the short-length telescoping beam 400 also contains a short-length first section 410, a short-length second section 420, and a short-length third section 430 allowing the short-length telescoping beam 400 to adjust as the linear actuators 100 rise or lower, affecting the level and shape of the sleep surface frame.

In further embodiments, as with the long-length telescoping beam 300, the short-length telescoping beam 400 may further comprise a mechanism to secure itself or be secured at a desired length. Additionally, the short-length telescoping beam 400 may also be made up of, in alternative embodiments, as few as two sections and as many as is desired.

Figure 5:
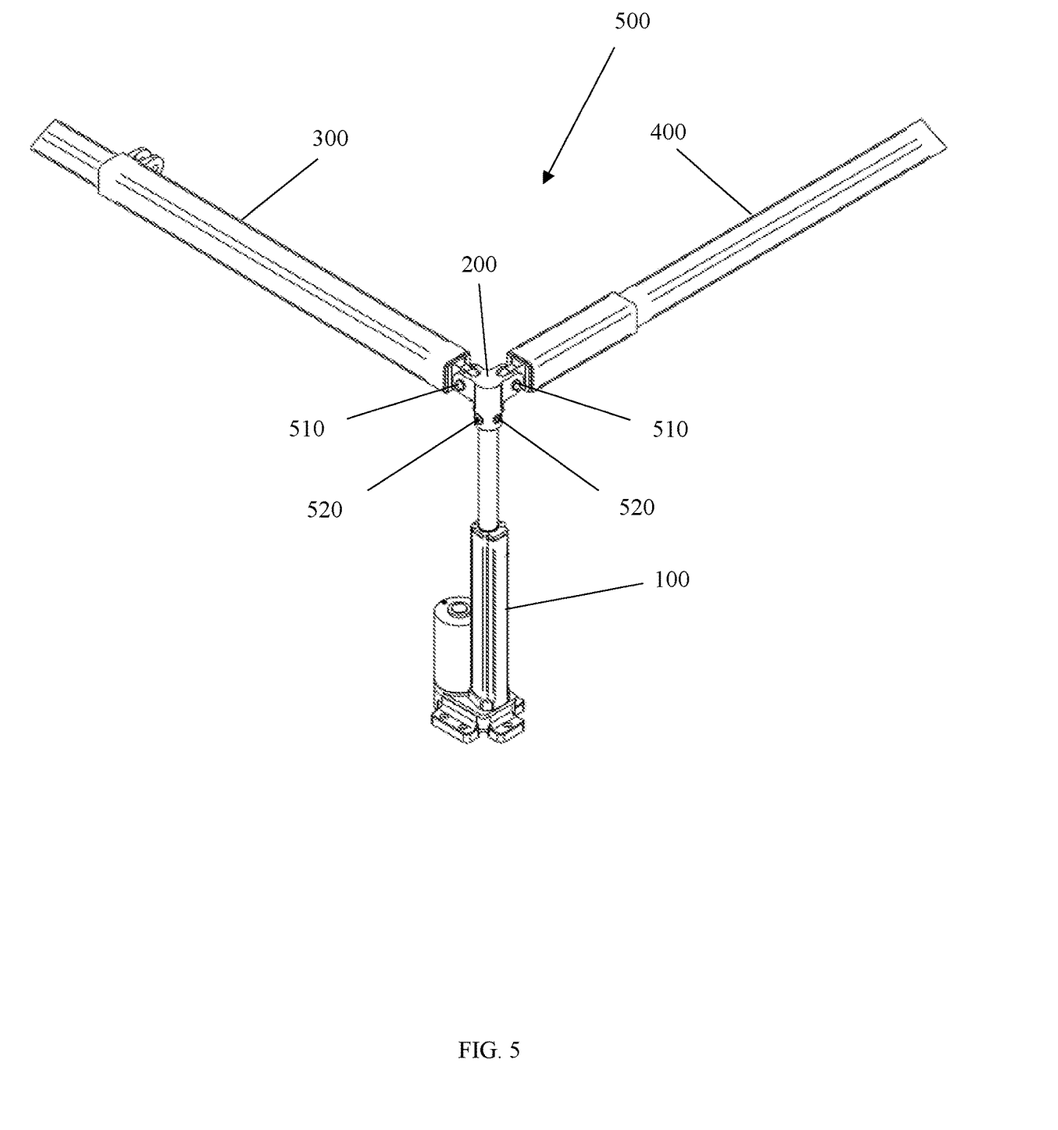
FIG. 5 depicts an exemplary assembly of one corner of a sleep surface frame of the present invention.

FIG. 5 depicts an exemplary assembly of one corner of a sleep surface frame of the present invention. In some embodiments, an assembly of one corner of the sleep surface frame 500 (or merely "assembled corner") is comprised of one long-length telescoping beam 300 and one short-length telescoping beam 400 coupled with one bi-directional joint 200; the bi-directional joint 200 also coupling with one linear actuator 100. In the depicted embodiment, the bi-directional joint 200 has a flat top side and a bottom side for receiving the extending member 130 of the linear actuator 100. In this embodiment, the long-length telescoping beam 300 and short-length telescoping beam 400 are coupled with the bi-directional joint 200 at roughly a ninety degree angle forming the assembled corner 500. Further, these beams are secured, in some embodiments, by sliding their respective end pivot joints 340 into the receiving first pivot joint 210 or second pivot joint 220 before the coupling is secured by a means such as a clevis pin 510. Those skilled in the art will appreciate that such a coupling produces a joint that is flexible about at least one axis which will prevent stress on the sleep surface frame when the linear actuators 100 elevate the assembled corner 500.

In some embodiments, the linear actuator 100 is secured within the cavity 240 of the bi-directional joint 200 via at least one securing means (such as a mounting screw) 520 that goes through one of the actuator securing mechanisms 230 and potentially coupling with the another of the actuator securing mechanisms 230 on the opposite side of the cavity 240 after the screw passes through the coupling structure 140 of the extending member 130.

In further embodiments, fasteners may be used to secure the angle of the extending member 130 by being placed inside the actuator securing mechanism 230 that does not face any coupling structure 140 and firmly applying pressure against the extending member 130 and securing the fastener in place. This is useful when the sleep surface frame achieves a level position, and the user wishes to add a bit more stability to the linear actuators 100 and assembled corners 500.

Figure 6:
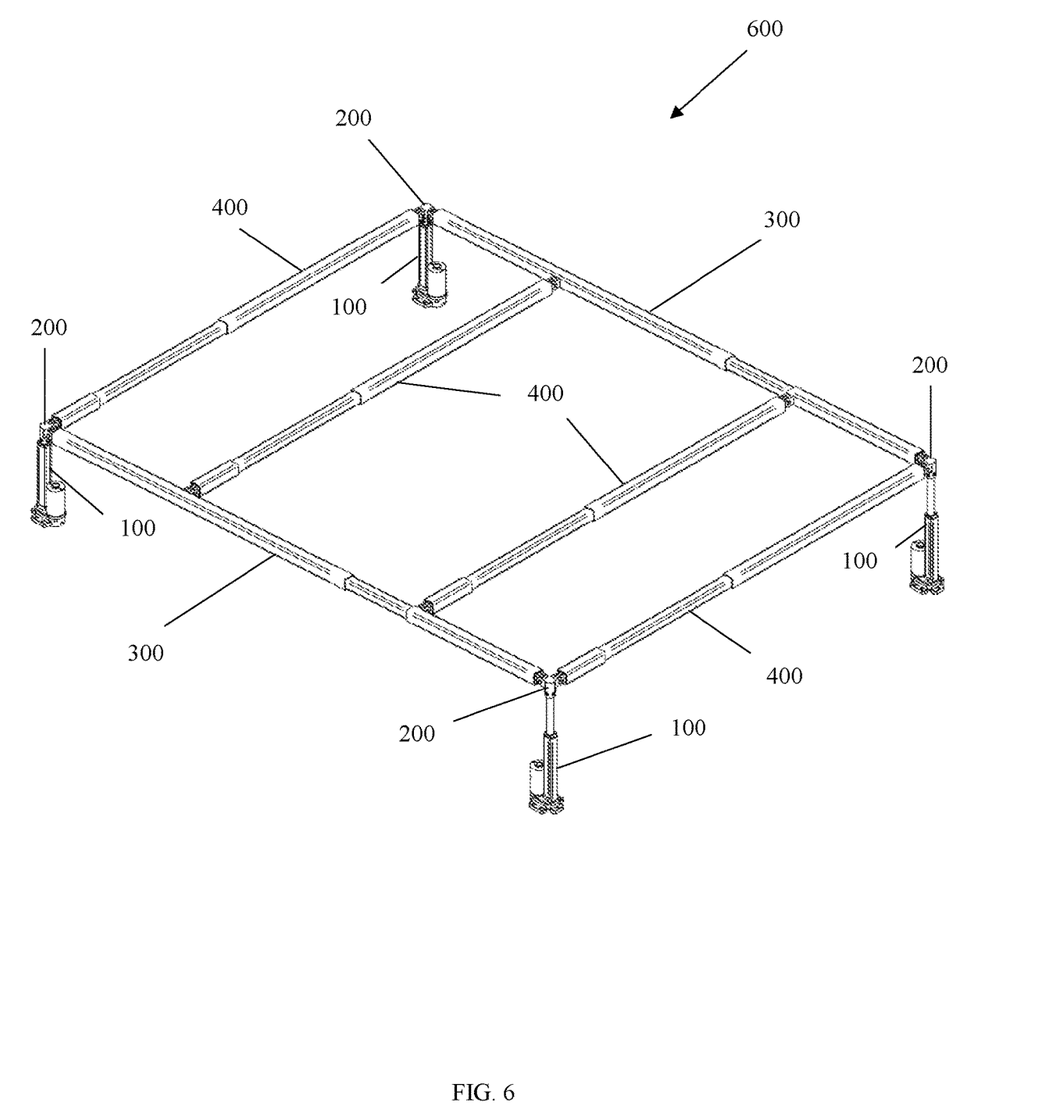
FIG. 6 depicts an exemplary embodiment of the full assembly of a sleep surface frame.

FIG. 6 depicts an exemplary embodiment of the full assembly of a sleep surface frame. The depicted embodiment consists of two long-length telescoping beams 300 running generally parallel to each other, four short-length telescoping beams 400 running generally parallel to each other while being generally perpendicular to the two long-length telescoping beams 300, four assembled corners 500 created between the coupling of one long-length telescoping beam 300 and one short-length telescoping beam 400 to one of four bi-directional joints 200 (using a total of two long-length telescoping beams 300 and two short-length telescoping beams 400 to create the rectangular structure that is the perimeter of a sleep surface frame 600), the remaining two short-length telescoping beams 400 connect generally perpendicularly to the long-length telescoping beams 400 via their interior pivot joints 360 (which face inward) making the remaining two short-length telescoping beams 300 function as crossbars for added stability and durability for the sleep surface frame 600, and four linear actuators 100 individually couple to the corresponding cavity 240 of the four bi-directional joints 200. It bears directly pointing out that that the orientation of couplings of beams to beams and beams to bi-directional joints are generally ninety degree angles when the sleep surface frame 600 is in a base position (when the linear actuators 100 are all at the same height while on a level surface); however, as the sleep surface frame 600 extends some or all of the linear actuators 100 when trying to level the sleep surface frame 600 while on an unlevel surface, the angles of the assembled corners 500 and the crossbars may askew some amount of degrees. In some embodiments, the first pivot joint 210, the second pivot joint 220, and the interior pivot joint(s) 360 may allow for their connected beams to deviate from their ninety degree angle in either direction. In further embodiments, for example, this deviation may be up to thirty degrees (between sixty and one-hundred and twenty degrees using the ninety degree right angles as starting points). This angular deviation may be accomplished by several options such as using a clevis pin, a pin, a plug, a screw, a retainer, or other similar means and combinations thereof to couple the beams to the joints or the joints being made of a material such as rubber which allows for some malformation without lasting damage to the joint, beam, or other parts of the sleep surface frame 600, the joints having receiving portions that are wider than is needed when engaged by a beam's end pivot joint, or any of the previously mentioned joints being connected to their respective beams or bi-directional joints via a coupling structure which allows for radial and/or linear flexibility.

In some embodiments, the linear actuators 100 are oriented in such a way that the actuator motors 120 will be positioned under the sleep surface frame 600 instead of outside of it. This orientation provides the user a little more space on the floor by keeping the actuator motors 120 tucked under the sleep surface frame 600. The linear actuators 100 may also need to be oriented in certain ways in order for the mounting brackets 150 to adequately couple to the sleeper vehicle.

The present invention's primary benefit is that the raising or lowering of any, some, or all of the extending members 130 to level the sleep surface frame 600 should not damage any component or put systemic stress or pressure on the sleep surface frame 600 due to the previously mentioned elements such as the telescoping beams, pivoted joint connections, bi-directional joints, and coupling means such as clevis pins. The balance achieved by the present invention between rigidity and flexibility is a vast improvement over currently known and/or used technology to resolve the problem. Further, the apparatus is more durable than many alternatives because the flexibility added by the telescoping beams and various joints means that the linear actuators 100 are always moving aligned in a single direction and not bending or struggling to move causing added stress and/or pressure to the frame, the joints, the beams, the actuators, or the coupling mechanisms.

In further embodiments, the linear actuators 100 are capable of raising the extending members 130 sufficiently high so that the user may use the space below the sleep surface frame. The sleep surface frame may be raised to the ceiling of the sleeper vehicle or be displaced to some level between the floor and the ceiling so that the sleep surface frame may be used as a shelf or table.

In some embodiments, the actuator motors 120 are controlled by a controller unit. The controller unit will require an operative connection to the actuator motors 120 which, in some embodiments, is achieved by cables running alongside, under, or through the telescoping beams and/or bi-directional joints. In further embodiments, these cables may be coiled as to expand and contract with the adjusting length of the telescoping beams. These coiled cables are also less likely to be pinched, caught, or otherwise interfered with when the actuators are adjusting the level of the frame (thereby adjusting the beams' length and/or the joints angles).

In more complex embodiments, the controller unit and actuator motors may be wirelessly connected. The benefit of these more complex embodiments being less wires would be needed that could interfere with the movement of the frame, the sleeper vehicle, or with another object within the sleeper vehicle. If wireless, the actuator motors would need a separate computer component to receive and send messages to the controller unit.

In some embodiments, position sensors and/or pressure sensors, plates, or similarly suited devices, or sensors that measure the length of displacement of the extending members may be used to determine the position of various points of the sleep surface frame as well as detect any pressure on the present invention. These sensors, plates, or devices are not required in the most basic forms on the invention; however, they generally add several desirable features. These desirable features include reliability and accuracy of positioning of the sleep surface frame; collision detection to prevent damage to the present invention, the user, or the van, camper, RV, or sleeper cab itself; and automatic adjustments of the sleep surface frame. A digital level is one example of a position sensor.

The controller unit, sensors, collision detectors, and actuator motors 120 also require a power supply to function. The power for the system may be wired similarly to how the cables run through, under, or along the telescoping beams to the other parts of the invention that need power, or the power supply may include wires that run along the floor, directly to a number of the linear actuators 100 and through the other electrically demanding components via access through or beside the extending member 130. All software may be stored on a computer readable medium that is part of the controller unit. Further, the controller unit may include a communication means such as RF, Bluetooth, Wi-Fi, or similar suited means to communicate with a remote (such as a standalone remote control or mobile device). If a mobile device is used to communicate with the controller unit, the mobile device should include software (such as a customized application) to interact with the controller unit to level the sleep surface frame. The controller unit may also include an analogue (such as buttons, switches, dials, etc.) or a digital input method (such as a touch screen) to allow the user to provide instructions to the controller unit which causes the unit to move and/or adjust the linear actuators. Even further, the controller unit may include software which will self-level the sleep surface frame based on previously recorded or preset positions and/or data from position and/or level detectors or the user may set at least one desired preset position for the linear actuators and the controller unit extends each extending member to its desired preset position. Alternatively, the remote control or application on a mobile device may retain the previously recorded positions and send a signal to the controller unit to cause the linear actuators to assume the previously recorded position.

In some embodiments, the controller unit may include collision detection software that uses sensors to detect a predetermined reading(s) of sensor outputs which signify a collision between the sleep surface frame and another object. When such a signal is received and determined to be a collision, the present invention will cease movement and/or discontinue power to the actuator motors 120 to prevent damage to the user, the present invention, or sleeper vehicle. Other types of sensors, such as pressure sensors, could also be used for these collision detection readings.

In alternative embodiments of the present invention, one of the bi-directional joints may be secured to the sleeper vehicle, acting as an anchor point. In these embodiments, the three other bi-directional joints and three linear actuators work with at least one level detection mechanism and software present on the controller unit to level the sleep surface frame using the anchor bi-directional joint acting as a centralized pivot point. In further alternative embodiments, the present invention may forgo the fourth bi-directional joint and instead anchor one intersection of the distal points of two of the beams (one corner of the generally rectangular sleep surface frame) to the sleeper vehicle or another support point or structure within the sleeper vehicle. The two anchored beams should be coupled to the sleeper vehicle or support point or structure with a coupling structure that allows for similar movement to that of the bi-directional joints so that when the other linear actuators adjust the sleep surface frame's position, the two anchored beams do not interfere with any movements.

In some embodiments, the level detection mechanism is at least one bubble level affixed to at least one position on the sleep surface frame to allow the user to quickly determine if the sleep surface frame is level. Typically, at least one bubble level is affixed to at least one beam at about that beam's center of its length to allow for the most accurate readings. In alternative embodiments, other known level detection mechanisms such as mercury switches may be used to determine the level of the frame at the points the mercury switches are installed. These examples, such as mercury switches, allow the controller unit to self-level the sleep surface frame. In some embodiments, accelerometers are placed at about the center point along the length of at least one beam as to give the most accurate measurements when the self-leveling sleep surface frame is adjusting the length of the linear actuator's 100 extending members 130 to level the sleep surface frame. This placement typically results in more accurate leveling due to the pitch and/or roll of the sleep surface frame in relation to the surface the sleeper vehicle is on.

In other embodiments, the level detection mechanism(s) may be placed within or outside the sleeper vehicle or affixed to the sleeper vehicle and the controller unit self-levels the sleep surface frame based on data from that level detection mechanism or those level detection mechanism.

In some embodiments, the controller unit may monitor the level of the sleep surface frame at periodic intervals and adjust the sleep surface frame to a level position if the sleep surface frame has exceeded a set parameter making the sleep surface frame no longer level within the tolerance outside that parameter. This is useful as the user or users sleep on the bed and adjust their positions because the shift in weight and location may slightly unlevel the sleep surface frame. In these embodiments, it is also useful for the user to be able to disable the controller unit's monitoring and re-leveling system, if desired. Further, the controller may have a preset parameter of deviation that will allow the sleep surface frame to be in before attempting to re-level the sleep surface frame.

The present invention may also allow users to set predefined slanted positions for the sleep surface frame if those users desired to slant their sleep surface in a certain orientation. In further embodiments, the user may dictate to the controller unit that the user desires the sleep surface to be slanted in one orientation and the controller unit will cause the linear actuators to accordingly adjust the sleep surface frame. This requires communication between at least one the leveling mechanism and/or at least one positioning mechanism, and software on the controller unit designed to calculate and adjust the sleep surface frame to the user's desired preset position.

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods, systems, and apparatus described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A self-leveling sleep surface frame for use in a sleeper vehicle, comprising: a sleep surface frame having at least four beams in a generally rectangular shape with four assembled corners created by an intersection of distal ends of two paired beams; wherein at least three of the beams are telescoping beams; at least three of the assembled corners being individually coupled with a bi-directional joint; at least three linear actuators for raising and lowering a portion of the sleep surface frame that are individually coupled via a coupling structure to at least three of the bi-directional joints; a mounting means coupled to each linear actuator which secures the self-leveling sleep surface frame inside the sleeper vehicle; a controller unit which is operatively connected to and causes one actuator of at least one of the linear actuators to move; and a power unit to supply power to the controller unit and the linear actuators.

2. The self-leveling sleep surface frame for use in the sleeper vehicle of claim 1 further comprising at least one crossbar which connects generally perpendicular to the set of the at least four beams that are aligned generally parallel to one another.

3. The self-leveling sleep surface frame for use in the sleeper vehicle of claim 1 further comprising at least one level detection mechanism.

4. The self-leveling sleep surface frame for use in the sleeper vehicle of claim 1 wherein the power unit further comprises at least one cable which is run internally through at least one of the beams of the set of the at least four beams to supply power to at least one of the linear actuators and controller unit.

5. The self-leveling sleep surface frame for use in the sleeper vehicle of claim 4 wherein the at least one cable is coiled.

6. The self-leveling sleep surface frame for use in the sleeper vehicle of claim 1 wherein at least one of the linear actuators is configured to extend far enough to leave space for storage and seating beneath the self-leveling sleep surface frame.

7. The self-leveling sleep surface frame for use in the sleeper vehicle of claim 1 wherein the mounting means is a mounting bracket that couples at least one of the linear actuators to the sleeper vehicle.

8. The self-leveling sleep surface frame for use in the sleeper vehicle of claim 1 wherein the mounting means is a guide rail secured to the sleeper vehicle and the guide rail being coupled to at least one of the linear actuators which allows the coupled linear actuator to move about a plane aligned with the guide rail.

9. The self-leveling sleep surface frame for use in the sleeper vehicle of claim 1 further comprising a position detection system.

10. The self-leveling sleep surface frame for use in the sleeper vehicle of claim 9 further comprising preset position software stored on a computer readable medium which allows a user to set at least one desired preset position, and which causes the actuators to conform to that desired preset position upon the preset position software receiving input from the user.

11. The self-leveling sleep surface frame for use in the sleeper vehicle of claim 9 wherein the controller unit communicates with the position detection system to determine a level of the sleep surface frame and automatically cause the linear actuators to adjust the level of the sleep surface frame to a leveled position based on data provided by the position detection system.

12. The self-leveling sleep surface frame for use in the sleeper vehicle of claim 1 further comprising a collision detection system.

13. The self-leveling sleep surface frame for use in the sleeper vehicle of claim 1 wherein the beams are configured to be disassembled.

14. The self-leveling sleep surface frame for use in the sleeper vehicle of claim 13 further comprising at least one pin that fits in at least one hole of at least one of the beams and when the at least one pin is removed, allows for disassembly of the beam.

15. The self-leveling sleep surface frame for use in the sleeper vehicle of claim 1 wherein joints are secured by a means selected from the group consisting of a clevis pin, a pin, a plug, a screw, a retainer, and combinations thereof.

16. The self-leveling sleep surface frame for use in the sleeper vehicle of claim 1 further comprising a remote which allows a user to cause the controller unit to adjust the linear actuators to a desired position.

17. The self-leveling sleep surface frame for use in the sleeper vehicle of claim 1 wherein the controller unit monitors a level of the sleep surface frame at periodic intervals and is configured to adjust the level of the frame if the sleep surface frame has deviated outside a set parameter.

18. The self-leveling sleep surface frame for use in the sleeper vehicle of claim 1 further comprising an item engaged with a top of the sleep surface frame selected from the group consisting of a bed mattress, a box spring, at least one substantially flat object that crosses at least two beams, and combinations thereof.

\* \* \* \* \*